United States Patent
McCoy

(10) Patent No.: US 11,182,376 B1
(45) Date of Patent: *Nov. 23, 2021

(54) IDENTIFYING VARIANCE IN DISTRIBUTED SYSTEMS

(71) Applicant: Quantcast Corporation, San Francisco, CA (US)

(72) Inventor: Scott S. McCoy, Oakland, CA (US)

(73) Assignee: Quantcast Corporation, San Francisco, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/694,782

(22) Filed: Nov. 25, 2019

Related U.S. Application Data

(63) Continuation of application No. 15/640,007, filed on Jun. 30, 2017, now Pat. No. 10,489,383.

(51) Int. Cl.
*G06F 16/23* (2019.01)
*G06F 16/2455* (2019.01)

(52) U.S. Cl.
CPC .... *G06F 16/2365* (2019.01); *G06F 16/24568* (2019.01)

(58) Field of Classification Search
None
See application file for complete search history.

(56) References Cited

U.S. PATENT DOCUMENTS

| | | | | |
|---|---|---|---|---|
| 2008/0071465 | A1* | 3/2008 | Chapman | G01C 21/3691 701/117 |
| 2008/0144743 | A1* | 6/2008 | Alderson | H04L 27/3845 375/324 |
| 2012/0016886 | A1 | 1/2012 | Cohen et al. | |
| 2014/0025658 | A1 | 1/2014 | Thiyagarajan et al. | |
| 2014/0035959 | A1* | 2/2014 | Lapstun | G02B 26/08 345/690 |
| 2014/0379922 | A1 | 12/2014 | Xiao et al. | |
| 2015/0378635 | A1 | 12/2015 | Skjolsvold et al. | |
| 2016/0180019 | A1* | 6/2016 | Van Rooyen | G16B 40/00 702/19 |

(Continued)

OTHER PUBLICATIONS

United States Office Action, U.S. Appl. No. 15/640,007, dated Apr. 5, 2019, six pages.

*Primary Examiner* — Wilson Lee
(74) *Attorney, Agent, or Firm* — Andrea Wheeler

(57) ABSTRACT

Adaptive Sampling. Data comprising pairings of data value with lists of data keys are received. The range of possible values of the data keys is partitioned into unbalanced buckets, with at least two of the unbalanced buckets representing different fractions of the range. Each unbalanced bucket is assigned to a respective processing unit selected from a plurality of processing units. The pairings are processed by the processing units, with each processing unit generating an intermediate result. The intermediate results are combined to generate a comprehensive result. A sampling error is determined by scaling an unbalanced bucket's intermediate result according to its corresponding fraction and comparing the scaled intermediate result to the comprehensive result. An unbalanced bucket having a sampling error less than a sampling error threshold is selected. The selected unbalanced bucket's corresponding fraction is selected as a sampling rate for a second data processing job.

24 Claims, 5 Drawing Sheets

(56) References Cited

U.S. PATENT DOCUMENTS

2018/0075138 A1* 3/2018 Perram ................... G06F 16/93
2019/0120815 A1* 4/2019 Chang .................... G01N 25/00
2019/0162950 A1* 5/2019 Lapstun ............. G02B 27/0075
2020/0142099 A1* 5/2020 Leonard .................. G01W 1/14

* cited by examiner

|  | Number of Unbalanced Buckets | Unbalanced Bucket Sizes |
|---|---|---|
| Configuration #1 | 14 | 25%, 25%, 10%, 10%, 5%, 5%, 4%, 4%, 3%, 3%, 2%, 2%, 1%, 1% |
| Configuration #2 | 25 | 20%, 15%, 10%, 9.517%, 9%, 8%, 7%, 6%, 5%, 4%, 3%, 2%, 1%, 0.5%, 0.5%, 0.5%, 0.1%, 0.1%, 0.1%, 0.01%, 0.01%, 0.01%, 0.001%, 0.001%, 0.001% |
| Configuration #3 | 5 | 50%, 20%, 15%, 10%, 5% |

FIG. 2

| Unbalanced Bucket Size | Intermediate Result | Scaled Result | Sampling Error |
|---|---|---|---|
| 25% | 25,001 | 100,004 | .00004 |
| 25% | 24998 | 99,992 | .00008 |
| 10% | 10,002 | 100,020 | .0002 |
| 10% | 9,997 | 99,970 | .0003 |
| 5% | 5005 | 100,100 | .001 |
| 5% | 4997 | 99,940 | .0006 |
| 4% | 4,006 | 100,150 | .0015 |
| 4% | 3,995 | 99,875 | .00125 |
| 3% | 3,005 | 100,167 | .00167 |
| 3% | 2,996 | 99,867 | .00133 |
| 2% | 2,006 | 100,300 | .003 |
| 2% | 1,996 | 99,800 | .002 |
| 1% | 1000 | 100,000 | 0 |
| 1% | 996 | 99,600 | .004 |

FIG. 3

Step 401
Data for a first data processing job is received

Step 402
The range of possible values of the data keys is partitioned into a plurality of unbalanced buckets

Step 403
Each unbalanced bucket is assigned to a processing unit

Step 404
Intermediate results are determined for each unbalanced bucket

Step 405
A comprehensive result is generated

Step 406
Intermediate results are scaled

Step 407
Sampling errors are determined

Step 408
A sampling rate for a second data processing job is determined

Step 409
A second data processing job is operated according to the determined sampling rate

FIG. 4

IDENTIFYING VARIANCE IN DISTRIBUTED SYSTEMS

CROSS-REFERENCE TO RELATED APPLICATIONS

This application is a continuation of U.S. Non-Provisional application Ser. No. 15/640,007 entitled "Identifying Variance in Distributed Systems" by Scott S. McCoy, filed on Jun. 30, 2017, which is hereby incorporated by reference in its entirety."

BACKGROUND

Technical Field

This invention pertains in general to processing of large data sets and in particular to adaptively setting sampling rates.

Description of Related Art

Processing queries on large data sets can be time consuming and resource intensive. In some cases, excellent estimates can be made using a subset of the data (e.g. sampled data), which can reduce the resource requirements of a query and expedite the production of results. However, the reliability of the results can depend on the size and quality of the sample, and it is important to select a good sampling rate (e.g. the ratio of the size of the sample to the size of the full data set). Furthermore, for some applications, datasets can be frequently updated, and keeping fresh query results can mean re-running the same or similar queries frequently. Often, sampling rates are selected and adjusted manually, which may not be suitable for some automated applications.

What is needed is an adaptive method for automatically selecting sampling rates.

SUMMARY

Embodiments of the invention include a method, a non-transitory computer-readable storage medium and a system for automatically and efficiently selecting a sampling rate for a sequence of data processing jobs. In an example, data for a first data processing job is received at a computing system. The received data comprises data values and corresponding data keys. For example, the data values can represent an observation or measurement; the data keys can be labels, with each label representing an entity having the data value in its history. In an example, the data keys can be labels such as browser cookies and the data values can represent webpage visits. The received data can comprise pairings, with each pairing comprising a data value with a list of data keys. The data keys have a range of possible values. The range of possible values is partitioned into a plurality of unbalanced buckets, with each unbalanced bucked corresponding to a fraction of the range of possible values of the data keys. The fractions can each represent a trial sampling rate, with at least two of the unbalanced buckets having different corresponding fractions. Each unbalanced bucket is assigned to a respective processing unit selected from a plurality of processing units. In an embodiment, the processing units are each provisioned with equivalent resources (e.g. hardware resources, software instructions, storage space, processing power, etc.). The pairings are processed by the processing units, with each processing unit generating an intermediate result. For example, each processing unit may be tasked with counting how many of its assigned data keys are common to all of the pairings of the received data (e.g. of the browsers represented by an assigned unbalanced bucket's data keys, how many visited all of the web pages of the pairings). The intermediate results are combined to generate a comprehensive result for the first data processing job (e.g. of all of data keys in the received pairings, how many data keys are common to all of the pairings of the received data). An unbalanced bucket having a sampling error which does not exceed a sampling error threshold is selected. The selected unbalanced bucket's corresponding fraction is selected as a sampling rate for a second data processing job. A sampling error is determined by scaling an unbalanced bucket's intermediate result according to the unbalanced bucket's corresponding fraction and comparing the scaled intermediate result to the comprehensive result. Advantageously, the disclosed invention trades off some efficiency in processing the first data processing job by using unbalanced buckets, in exchange for the efficient and automatic determination of a suitable sampling rate for the second data processing job.

In an embodiment, the sampling rate for a second data processing job is determined by selecting a group of one or more unbalanced buckets having a group sampling error which does not exceed a sampling error threshold. A group sampling error is determined by: generating a group fraction by summing the fractions of the unbalanced buckets in the selected group of one or more unbalanced buckets, generating a group intermediate result by combining the intermediate results of processing the unbalanced buckets in the selected group of one or more unbalanced buckets, scaling the group intermediate result according to the group fraction, and comparing the scaled group intermediate result to the comprehensive result.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2 illustrates a table of examples of unbalanced bucket configurations.

FIG. 3 illustrates a table of example results.

FIG. 4 is a flow chart illustrating a method of processing data, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide an automatic and efficient method for determining a sampling rate for a sequence of data processing jobs. To optimize throughput, a prior art processing system may generate balanced or nearly balanced partitions for processing in a distributed or parallel system. In contrast, embodiments of the invention purposely configure unbalanced buckets which are unbalanced partitions, and assign unbalanced data loads (e.g. unbalanced buckets) to each of a plurality of processing units; the intermediate results obtained from the unbalanced partitions enable the system to rapidly and efficiently determine a sampling rate for subsequent processing jobs, which offsets the inconvenience of having some processing units complete their tasks before others due to variation in the data loads across the processing units. Advantageously, the invention can adapt to fluctuations in the quality and quantity of data, as subsequent data processing jobs can process sampled data using unbalanced buckets, and can adjust sampling ratios according to sampling errors of intermediate results.

Embodiments of the invention are described below in the context of a browsing history measurement system for measuring a magnitude of audience overlap. It is noted that similar techniques as those described below can be used in the context of other kinds of measurement systems (e.g. instrumented scientific, industrial, or manufacturing systems) observations, or for measuring other types of networked media as well. Such techniques are particularly useful where accurate, timely results on large volumes of frequently updated measurement data are desirable to support rapid decision-making in automated environments.

Figure 1:
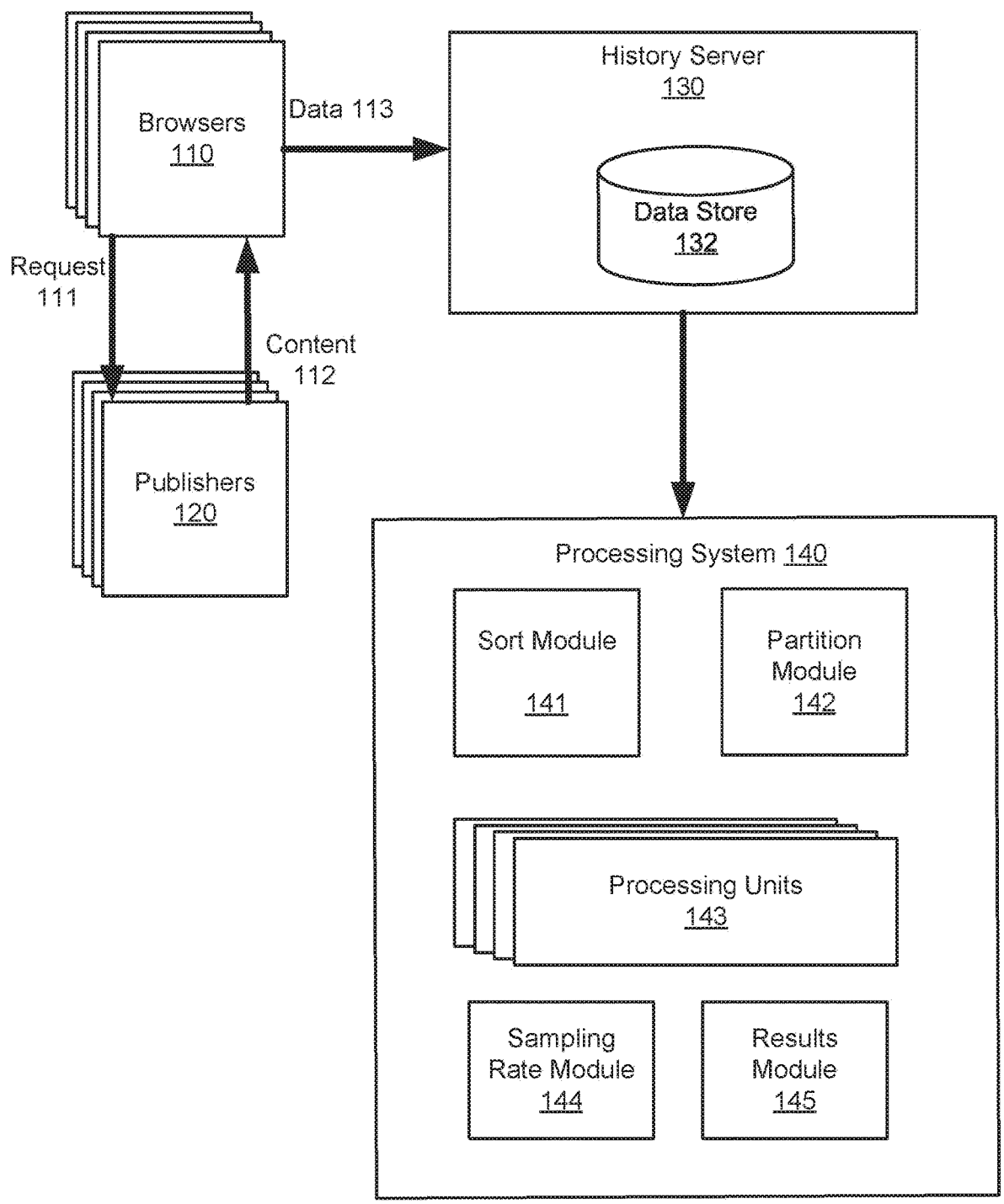
FIG. 1 is a high-level block diagram of a computing environment for processing, in accordance with an embodiment of the invention.

FIG. 1 is a high-level block diagram of a processing environment 100, in accordance with an embodiment of the invention. The environment includes recipients such as users' browsers 110, publishers 120, a history server 130, and a processing system 140. These elements are connected by a communications network (not shown), such as a local area network, a wide area network, a wireless network, an intranet, a cable network, a satellite network, a cellular phone network, an optical network, the Internet or combinations thereof.

Recipients can be users' browsers 110 such as web browsers executing on user devices, such as personal computers, laptop computers, tablet computers, and smartphones, as the users of those devices browse the web. As users undertake their normal web browsing activities using the browsers 110, in one embodiment, data 113 for some media consumption events is reported to the history server 120. A media consumption event is the act of accessing content over a network, such as, but not limited to, accessing a web page from a web server. A variety of methods exist for associating a label with a web browser. For example, a software label such as a cookie value can be locally stored at a web browser. In other embodiments, labels can be composed and/or stored remotely from a device associated with the user. In some cases, a browser can have multiple labels, such as multiple first party cookies and multiple third party cookies, which can be set or exchanged with various systems. A history server 130, such as a direct measurement system, can collect and/or receive information for a browser or a system in conjunction with the label(s). In an example, when a browser requests content from a content provider, such as publisher 120, the content provider can direct the browser to submit a pixel request to the history server 130. The pixel request can include information, such as a label, and through this request and optional subsequent actions and/or interactions, the history server 130 can collect and/or receive information from the browser in conjunction with a label, such as a cookie value, in order to enable the maintenance of a coherent body of information, such as a consumption history (i.e. history of consumption of media), a portion of a consumption history, a consumption history score, a consumption history characterization and/or a consumption history digest, over time.

In the example illustrated in FIG. 1, the history server 130 receives data 113 from the browsers 110. The received data 113 enables the history server 130 to record media consumption events in a data store 132 in conjunction with one or more labels, such as cookie values. In FIG. 1, data store 132 is shown as internal to the history server 130, but in other implementations, data store 132 may be external to or remote from the history server 130. Also, only one instance of data store 132 is shown in FIG. 1 for clarity, but in practice, the histories may be stored in a plurality of data stores, such as a distributed network of storage facilities.

The processing system 140 receives consumption histories from the history server 130. Although as illustrated in FIG. 1, the data 113 is streamed first to the history server 130, and the consumption histories are then provided to the processing system 140, data (e.g. consumption histories or portions thereof) may be sent from a publisher 120 to the history server 130. In another example, the history server 130 may be internal to the processing system 140, with the processing system 140 receiving data 113 from the browsers 110, the publishers 120, or both.

The processing system 140 comprises a sort module 141, a partition module 142, processing units 143, a results module 144, and a sampling rate module 145.

In one embodiment, processing system 140 is configured to complete the job of determining the number of browsers 110 which visited each webpage in a group of two or more webpages. In other words, the result will be the size of the "audience overlap" for the group of webpages. Because Internet browsing patterns are unpredictable, it may be desirable to repeat the same job or query frequently to acquire fresh results. In this example, each webpage may have a data value which corresponds to the webpage, such as a partial or complete URL (Uniform Resource Locator). Each browser will have a data key, such as a label (e.g. a cookie), which can be unique or nearly unique. Although the operation of the invention is illustrated with the example of browsers, webpages, and audience overlap, it is understood that the invention can be used for a variety of data values which represent measurements or items, such as items of content (e.g. a networked resource, music content available over a network, video content available over a network) or collections of items, such as collections of items of content (e.g. a website which is a collection of webpages, a collection of commonly owned websites, a collection of webpages having the same topic, a collection of webpages having the same tag embedded in their webpage content). Similarly, the invention can be used in conjunction with a variety of different data keys (first party cookies, third party cookies, combinations thereof) and to obtain results of a variety of different kinds of queries, including queries expressed using Boolean logic such as queries expressed in disjunctive normal form (DNF).

Consumption histories of a plurality of recipients are collected at a history server 130. For example, a consumption history such as a browser's media consumption history may include features such as websites visited, webpages visited, keyword searches entered, online purchases made, geographic location, type of browser, etc. In some cases, an item of content, such as a webpage, may have one or more tags embedded in their content which may or may not be visible or detectable by a user. A website operator may use tags to categorize the webpages of their website. In some cases, a mapping of features, such as web page URLs, and their corresponding tags may be stored at the history server 130. Tags can be included in a recipient's consumption history. In an example, a browser's consumption histories may be stored as a data key (e.g. a label of the browser) with a list of data values (e.g. a list of websites visited, tags, browser version, etc.).

In an embodiment, a sort module 141 may sort the histories to prepare the histories for processing. For example, sort module 141 may receive histories from history server 130, and produce a list of pairings. In an embodiment, the sort module 141 can receive histories (e.g. data keys with a list of data values) and produce an inverted structure comprising a set of pairings such as a set of data values (e.g. a list of websites), with each data value paired with a list of data keys (e.g. labels of browsers which visited the website). In an embodiment, the set of data values can comprise one or more types of data value (e.g. websites only, websites and tags).

The sort module 141 may sort one or more of the data key lists (e.g. lists of labels). For example, a data value corresponding to "website A" might have a list of ten thousand data keys, with each data key representing a label of a browser which visited "website A". In an example, a label may be a browser's cookie having a cookie value or a hashed cookie having a hashed cookie value. Commonly, a cookie value is an alphanumeric string that is assigned to a recipient, such as a browser. A one-way function, such as a hash function, can be applied to a cookie which has a cookie value to generate a hashed cookie which has a hashed cookie value. Replacing a cookie value in a history with a hashed cookie value can provide additional privacy for the recipients and reduce the risk of re-identification. Furthermore, a hash function can map inputs (e.g. cookie values) to a range of uniformly distributed outputs (e.g. hashed cookie values) which is advantageous for subsequent processing. In some examples, the data keys may have been hashed before receipt by the processing system 140; in some examples, data keys may be hashed by the processing system.

In an embodiment, partition module 142 receives pairings from the sort module 141. The data keys of the received pairings have a range of possible values. In an example, the range of possible values may be described by a minimum possible value and a maximum possible value. The partition module 142 partitions the range of possible values into a plurality of unbalanced buckets, with each unbalanced bucket corresponding to a fraction of the range of possible values. At least two of the unbalanced buckets have different corresponding fractions. As a result, each data key is assigned to an unbalanced bucket, with no data key assigned to more than one unbalanced bucket.

In an embodiment of the invention, the relative sizes of the unbalanced buckets may be configured. FIG. 2 illustrates a table of examples of unbalanced bucket configurations. Configuration #1 has fourteen unbalanced buckets, with seven different unbalanced bucket sizes; each fraction is represented twice (e.g. there are two unbalanced buckets having a corresponding fraction of 25%). For Configuration #1, the largest unbalanced bucket is more than twice the size of the smallest unbalanced bucket. The ratio of the largest bucket to the smallest bucket is 25:1.

The ratio of the largest unbalanced bucket to the smallest unbalanced bucket is more pronounced in Configuration #2 than it is for Configuration #1. The ratio of the largest bucket to the smallest bucket is 20,000:1 for Configuration #2. Configuration #2 has twenty-five unbalanced buckets, with seventeen different unbalanced bucket sizes. Some fractions are represented multiple times (e.g. there are three unbalanced buckets having a corresponding fraction of 0.5%), and some fractions are only represented once (e.g. there is only one unbalanced bucket having a corresponding fraction of 20%).

Configuration #3 has five unbalanced buckets, with five different unbalanced bucket sizes. For Configuration #3, no two buckets have the same corresponding fraction.

In an embodiment, the processing system 140 comprises a plurality of processing units 143, with each processing unit provisioned with equivalent resources (e.g. hardware configuration, software configuration). In an example, the processing units can be workers in a MapReduce implementation. In an example, the processing units can be hardware and/or software modules in a distributed or parallel processing system. In an embodiment, the partition module 142 generates a number of unbalanced buckets equal to the number of configured processing units. Each unbalanced bucket is assigned to a processing unit.

Each processing unit receives an assigned unbalanced bucket and produces an intermediate result. For the example job of counting the number of browsers 110 which visited each webpage in a group of two webpages, the processing system can receive a first pairing having a data label of website A and a list of data keys comprising labels of browsers which visited website A and a second pairing having a data label of website B and a list of data keys comprising labels of browsers which visited website B. According to Partition Configuration #1 of FIG. 2, partition module 142 could partition the range of possible values of the data keys into fourteen unbalanced buckets. Each unbalanced bucket is assigned to a processing unit, and each processing unit processes each task for the data keys (e.g. browser labels) from the data keys in their assigned unbalanced bucket. Each processing unit generates an intermediate result. In this example, each processing unit will generate an intermediate result by determining how many browser labels in its assigned unbalanced bucket also appear in the list of data keys in the second pairing.

FIG. 3 illustrates a table of example results. The results module 144 can receive the intermediate results and generate a comprehensive result. For the example job of counting the number of browsers which visited both website A and website B, this can mean summing the intermediate results to obtain a count.

The sampling rate module 145 can receive the intermediate results and the comprehensive results and select a sampling rate for a subsequent job. The sampling rate module 145 can determine a sampling error for an unbalanced bucket by comparing a scaled result of an unbalanced bucket to the comprehensive result. For example, each unbalanced bucket has an intermediate result and an assignment of a fraction of the selected pairing's data keys. Each intermediate result can be scaled according to its corresponding fraction. For example, an unbalanced bucket may have an intermediate result of 25,001, which can represent the number of browsers corresponding to browser labels in the unbalanced bucket's assigned data keys which visited both website A and website B; if the unbalanced bucket's corresponding fraction was 25%, then scaling the intermediate result can mean dividing the intermediate result by 0.25, resulting in a scaled result of 100,004. In an example, a sampling error can be determined by calculating a magnitude of the difference between the scaled result and the comprehensive result and dividing that difference by the comprehensive result. For example, if a comprehensive result is equal to a count of 100,000 and an unbalanced bucket's scaled result is 100,004, then a sampling error for the unbalanced bucket can be:

|100,000−100,0041/100,000 which is equal to 0.00004 or 0.004%. Accordingly, the sampling rate module 145 can predict a sampling error of 0.0004% if a sampling rate of 25% is used in subsequent processing jobs.

The sampling rate module 145 can determine a sampling error for some or all of the unbalanced buckets and select an unbalanced bucket having a sampling error that does not exceed a sampling error threshold. The selected unbalanced bucket's corresponding fraction can be selected as the sampling rate for subsequent jobs or used to generate the sampling rate for subsequent jobs (e.g. round up the selected unbalanced bucket's corresponding fraction to obtain the sampling rate).

In some cases, two unbalanced buckets having the same corresponding fraction can have different intermediate results. For example, pairings processed according to Configuration #1 of Table 1 will produce two intermediate results for two different unbalanced buckets which each have a different 10% of the selected pairing's data keys. Consider the example where the two intermediate results are 10,002 and 9,997, and the comprehensive result is 100,000. The sampling rate module 145 can determine the range of values of inter mediate results, sampling error, or both for sets of unbalanced buckets having the same corresponding fraction. If the range of values of intermediate results and/or sampling error for a set of unbalanced buckets having the same corresponding fraction exceeds a variance threshold, then the sampling rate module 145 can determine that the corresponding fraction is unsuitable as the sampling rate for subsequent jobs.

In some cases, even the fraction corresponding to the largest unbalanced bucket may not be suitable as a sampling rate for a subsequent processing job. For example, the sampling error for the largest unbalanced bucket may exceed the sampling error threshold, the variation in intermediate results or sampling errors among multiple unbalanced buckets having the same corresponding fraction may exceed a variance threshold, or combinations thereof. In an example, the processing system 140 may select a new unbalanced bucket configuration for a second processing job. In an embodiment, the processing system 140 can receive data for a second data processing job and use a different configuration which partitions the range of possible values for the data keys into fractions which may be larger than the fractions used for the first data processing job. For example, the unbalanced bucket configuration of the second data processing job can comprise unbalanced buckets, at least one of which is larger than the largest unbalanced bucket of the previous processing job. Because no suitable sampling rate was determined in the previous processing job, the unbalanced buckets of the new unbalanced bucket configuration may not be sampled ("unsampled buckets"), and all of the data keys of the second processing job may be processed.

The processing system 140 can process the next batch of data with the new configuration, and attempt to discover a suitable sampling rate.

In another example, the processing system 140 can generate unbalanced bucket groups, and determine a suitable sampling rate for subsequent processing jobs according to the group results. This can be useful, especially if the fraction corresponding to the largest unbalanced bucket of the first processing job was not found to be suitable as a sampling rate for a subsequent processing job. For example, a group fraction can be determined by summing the corresponding fractions of the unbalanced buckets in the group. For example, for a group comprising the two unbalanced buckets having a corresponding fraction of 25% in FIG. 3, the group fraction would be 0.25+0.25=0.5. The intermediate results can also be summed to form a group intermediate result (e.g. 25,001+24,998=49,999). The group intermediate result can be scaled according to the group fraction to produce a group scaled result (e.g. 49,999/0.5=99,998). A group sampling error can be determined by comparing the group scaled result to the comprehensive result (e.g. 1100,000−99,9981/100,000=0.00002). The group sampling error can then be compared to the sampling error threshold to determine if the group fraction is a suitable sampling rate for subsequent processing jobs.

In an embodiment, the system may process subsequent processing jobs according to a selected sampling rate. In some cases, the process of selecting a sampling rate may be repeated from time to time to insure that a suitable sampling rate is used. In an example, a new sampling rate may be selected according to a time schedule (e.g. daily), a number of jobs (e.g. every tenth processing job), a volume of data (e.g. after every PetaByte is processed), a trigger (e.g. a change in the size of a scaled result exceeds a threshold), by request, or combinations thereof.

A sampling rate can be represented as a fraction (e.g. ¼, 0.25, 25%). For example, a sampling rate of 0.25 can mean that one out of every four data keys contributes to generating the result, while three out of every four data keys are ignored and do not contribute to the generating the result. Ignoring a data key can mean discarding or deleting the data key. Ideally, the process of sampling does not introduce significant bias.

In an example, the processing system 140 may determine that the fraction corresponding to the smallest unbalanced bucket is a suitable sampling rate. In this case, it is possible that an even smaller sampling rate would be suitable. In an embodiment, the processing system 140 can receive data for a second data processing job, and can process the second processing job according to the selected sampling rate (e.g. the fraction corresponding to the smallest unbalanced bucket). Accordingly, the data load of the second processing job will be reduced according to the selected sampling rate. In an example, the processing system 140 may attempt to discover a sampling rate for a third data processing job by partitioning the sampled data of the second processing job and repeating the analysis. In the event that an unbalanced bucket which is suitable is discovered from operating the second processing job (which is operating on a sampled set of data), the sampling ratio can be adjusted for a third processing job. For example, if the sampling rate of the second job is 1% (e.g. only 1% of the data received for the second processing job contributes to the result of the second processing job) and if an unbalanced bucket representing 20% of the range of possible values of the data keys is selected as suitable from analyzing the sampled data, a sampling rate for a third data processing job can be chosen according to the product of the sampling rate and the unbalanced bucket size, which in this case would be 20% multiplied by 1%, or 0.2%.

FIG. 4 is a flow chart illustrating a method in accordance with an embodiment of the invention. In some implementations, the steps are performed in an order other than the order presented in FIG. 4, and in other implementations, additional or alternative steps may be performed.

In step 401, data for a first data processing job is received. The data can comprise a plurality of pairings, each pairing comprising a data value (e.g. a measurement, such as a measured visit to a particular website or a measured visit to a website having a particular tag) and a list of data keys (e.g. labels, such as labels of visitors corresponding to the measurement). The data keys have a range of possible values. In an example, the range of possible values of a cookie is the range of the lowest valid value a cookie can take to the highest valid value a cookie can take. In contrast, the range of actual values of data keys is the range of the lowest data key value represented in the received data to the highest data key value represented in the received data.

In step 402, the range of possible values of the data keys is partitioned into a plurality of unbalanced buckets. Each unbalanced bucket corresponds to a fraction of the range of possible values of the data keys. At least two unbalanced buckets correspond to different fractions.

In step 403, each unbalanced bucket is assigned to a processing unit. The processing system 140 comprises a plurality of processing units. In some embodiments, the processing system deploys one processing unit for each unbalanced bucket. The processing units can each be provisioned with equivalent resources (e.g. hardware resources, software instructions, storage space, processing power, etc.). However, in some embodiments, some resources may be provisioned for the processing units according to the corresponding fraction of their assigned unbalanced bucket. For example, a processing unit with an assigned unbalanced bucket having a corresponding fraction of 10% may be provisioned with 10% of a pool of memory resource. In an example, a processing unit with an assigned unbalanced bucket having a corresponding fraction of 10% may be provisioned with twice the storage space as a processing unit with an assigned unbalanced bucket having a corresponding fraction of 5%, which is proportional to the relative sizes of the unbalanced buckets.

In step 404, intermediate results are determined for each unbalanced bucket. Each processing unit processes the data keys of their assigned unbalanced bucket to produce an intermediate result.

In step 405, a comprehensive result is generated. In an example, the comprehensive result may be acquired by compiling the intermediate results.

In step 406, intermediate results are scaled. An unbalanced bucket's intermediate result can be scaled according to the fraction corresponding to the unbalanced bucket. For example, if the fraction is 20%, then the unbalanced bucket's intermediate result can be scaled by dividing the intermediate result by 0.2.

In step 407, sampling errors are determined. A sampling error can be determined by comparing a scaled intermediate result to a comprehensive result. For example, a sampling error may be determined by taking the absolute value of the difference between a scaled intermediate result and a comprehensive result and dividing that by the comprehensive result. Sampling errors may be determined for some or all of the intermediate results.

In step 408, a sampling rate for a second data processing job is determined. A sampling error threshold may be received and configured for a processing job, a set of received data or a processing system. A suitable sampling rate for a second data processing job is determined according to quantified criteria such as a sampling error threshold, a variance threshold, a minimum sampling rate floor, or combinations thereof. In an example, an unbalanced bucket's sampling error determined in step 407 can be compared to the configured sampling error threshold to determine if the fraction corresponding to the unbalanced bucket is a suitable sampling rate or is suitable for use in determining a sampling rate. In some cases, the task of determining a sampling rate for the second processing job may be completed without determining a sampling error for all of the unbalanced buckets.

The processing system may select the smallest fraction corresponding to an unbalanced bucket having a sampling error that meets the quantified criteria. In an example, the selected fraction may be selected as the sampling rate for the second data processing job. In some cases, the selected fraction may be used to determine the sampling rate for the second data processing job. For example, the selected fraction may be rounded up for convenience (e.g. produce a sampling rate of 0.25 from a selected fraction of 0.231 by rounding up). In an example, the selected fraction may be increased to guard against introducing too much error as the result of fluctuations in data quality or quantity. For example, the processing system 140 may produce a sampling rate of 0.25 from a selected fraction of 0.20 by multiplying the selected fraction by 1.25 or produce a sampling rate of 0.23 from a selected fraction of 0.18 by adding an increment of 0.05.

The range of values of sampling errors for two or more unbalanced buckets having the same corresponding fraction can be compared to a variance threshold to determine if the corresponding fraction is a suitable sampling rate or suitable for determining a sampling rate; corresponding fractions having a variance that is too high may be rejected as unsuitable, even if one of the unbalanced buckets having the corresponding fraction has a sampling error that is less than the sampling error threshold. In an example, a variance may be determined for some fractions according to the sampling errors determined in step 407, and then the fraction corresponding to the set of unbalanced buckets having the largest suitable variance may be selected as the sampling rate or used to determine a sampling rate.

In an example, the fractions corresponding to the sampling errors determined in step 407 may be compared to a minimum sampling rate floor. In the event that a selected fraction meets all of the other criteria but is less than the sampling rate floor, the sampling rate for the second processing job may be set at the sampling rate floor.

In step 409, a second data processing job is operated according to the determined sampling rate. Operating a data processing job according to a determined sampling rate means using a fraction of the data processing job's data to estimate a result for the data processing job. In an example, operating a data processing job with a sampling rate of 25% means that only 25% of the data processing job's data contributes to the result. For example, a partial result may be determined using 25% of the data processing job's data and the partial result may be scaled to produce an estimate, which is the result of the data processing job. In an embodiment, some care is taken to insure that the data which is selected to contribute to the data processing job's result does not bias the result.

Physical Components of a Computer

Figure 5:
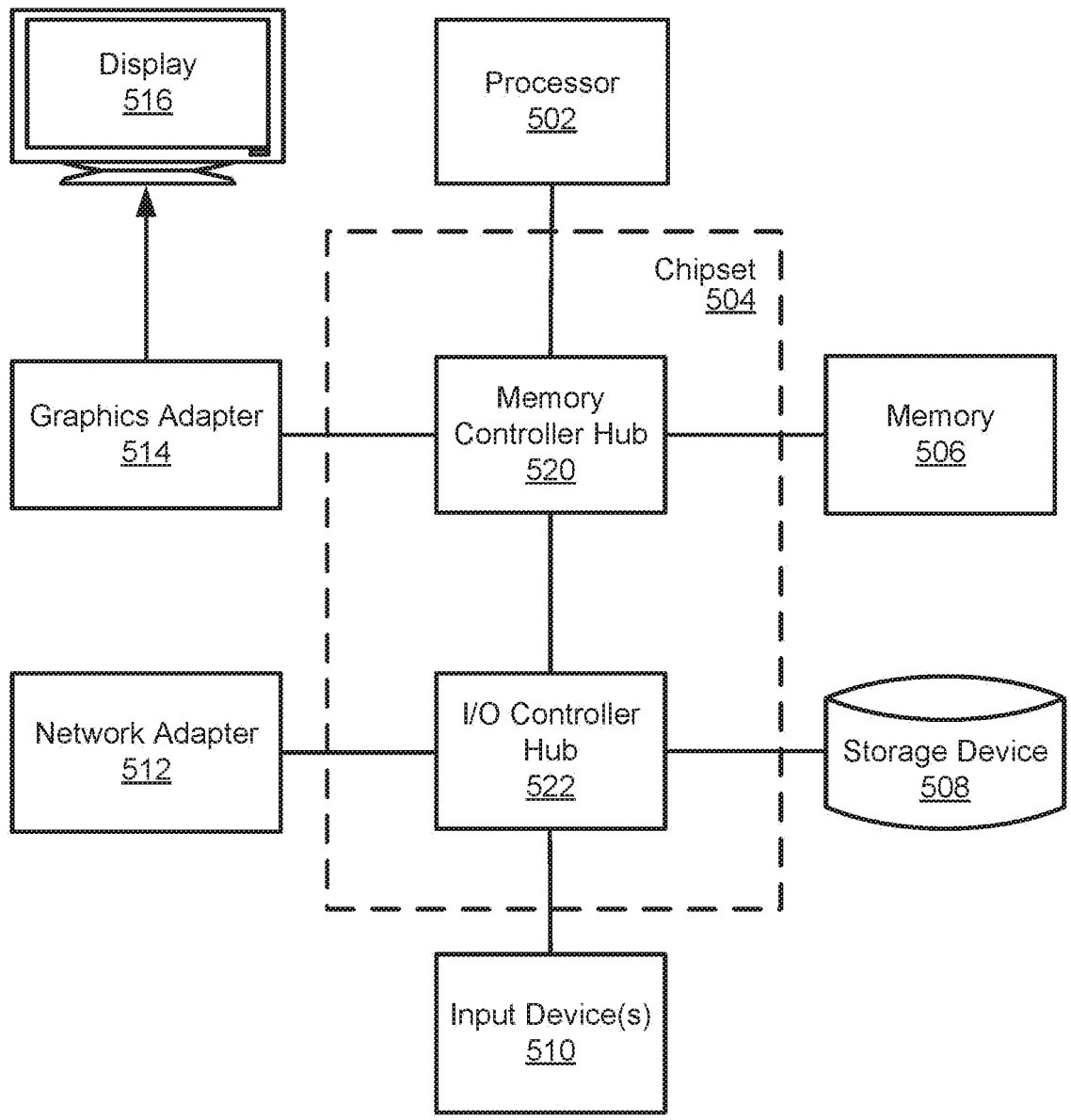
FIG. 5 is a high-level block diagram of the components of a computing system for use, for example, as a publisher 120, a browser 110, a history server 130, a processing unit 143, or a processing system 140, depicted in FIG. 1, in accordance with an embodiment of the invention.

FIG. 5 is a high-level block diagram of the components of a computing system for use, for example, as a publisher 120, a browser 110, a history server 130, a processing, or a processing system 140, depicted in FIG. 1, in accordance with an embodiment. Illustrated are at least one processor 502 coupled to a chipset 504. Also coupled to the chipset 504 are a memory 506, a storage device 508, input device(s) 510, a network adapter 512, and a graphics adapter 514. A display 516 is coupled to the graphics adapter 514. In one embodiment, the functionality of the chipset 504 is provided by a memory controller hub 520 and an I/O controller hub 522. In another embodiment, the memory 506 is coupled directly to the processor 502 instead of the chipset 504.

The processor 502 is the hardware logic circuitry of the computer 500 that processes instructions such as computer programs to operate on data. The memory 506 holds instructions and data used by the processor 502. The storage device 508 is any non-transitory computer-readable storage medium, such as a hard drive, compact disk read-only memory (CD-ROM), DVD, or a solid-state memory device. The input devices(s) 510 may be a keyboard, mouse, track ball, touch-sensitive screen and/or another type of pointing device to input data into the computer 500. The network adapter 512 couples the computer 400 to a network. The graphics adapter 514 displays images and other information on the display 516.

As is known in the art, a computer 500 can have different and/or other components than those shown in FIG. 5. In addition, the computer 500 can lack certain illustrated components. In one embodiment, a computer 500 acting as a server may lack an input device 510, a graphics adapter 514, and/or a display 516. Moreover, the storage device 508 can be local and/or remote from the computer 500 (such as embodied within a storage area network (SAN)).

As is known in the art, the computer 500 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A computer-implemented method comprising:
adaptively selecting a first sampling rate, comprising:
determining a first plurality of trial sampling rates corresponding to a first data processing job, comprising:
assigning a first data, received from a first data store on a first server, having a first range of values, to a first plurality of buckets by assigning data corresponding to a respective fraction of the first range of values to each bucket, wherein at least two buckets are assigned different fractions, and wherein each fraction represents a corresponding trial sampling rate;

determining a plurality of sampling errors, each sampling error corresponding to a respective one of the plurality of buckets, comprising:
assigning each of the plurality of buckets to a respective processing unit;
receiving, for each bucket, an intermediate result of processing the corresponding data by the assigned processing unit;
combining the intermediate results to generate a first comprehensive result corresponding to the first data;
scaling the intermediate result for each bucket according to the respective fraction of the first range of values corresponding to each bucket; and
comparing the scaled intermediate result for each bucket to the first comprehensive result; and
responsive to determining that a first bucket of the first plurality of buckets has a corresponding sampling error below a threshold, selecting a first sampling rate for a second data processing job corresponding to a second data, received from a second data store on a second server, by selecting the trial sampling rate corresponding to the first bucket.

2. The method of claim 1, wherein the first data comprises a plurality of pairings comprising a data value and a list of data keys, and wherein the range of values corresponds to the range of values of the data keys.

3. The method of claim 1, wherein selecting the first sampling rate for the second data processing job further comprises sampling the second data according to the selected first sampling rate for the second data processing job.

4. The method of claim 1, wherein adaptively selecting the first sampling rate further comprises:
determining a second plurality of trial sampling rates corresponding to a second data processing job, comprising:
assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
determining a second plurality of sampling errors, each sampling error corresponding to one of the second plurality of buckets, comprising:
assigning each of the plurality of buckets to a respective processing unit;
receiving, for each bucket, an intermediate result of processing the corresponding data by the assigned processing unit;
combining the intermediate results to generate a second comprehensive result corresponding to the second data;
scaling the intermediate result for each bucket according to the respective fraction of the second range of values corresponding to each bucket; and
comparing the scaled intermediate result for each bucket to the second comprehensive result; and
responsive to determining that a second bucket of the plurality of buckets has a corresponding sampling error below a threshold, determining a second sampling rate for a third data processing job corresponding to a third data by selecting the trial sampling rate corresponding to second bucket and multiplying the selected trial sampling rate with the sampling rate for the second data processing job.

5. The method of claim 1, wherein adaptively selecting the first sampling rate further comprises, further comprises:
responsive to determining that no bucket of the first plurality of buckets has a corresponding sampling error below a threshold:
determining a second plurality of trial sampling rates corresponding to a second data processing job, comprising:
assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
determining a second plurality of sampling errors, each sampling error corresponding to one of the second plurality of buckets, comprising:
assigning each of the plurality of buckets to a respective processing unit;
receiving, for each bucket, an intermediate result of processing the corresponding data by the assigned processing unit;
combining the intermediate results to generate a second comprehensive result corresponding to the second data;
scaling the intermediate result for each bucket according to the respective fraction of the second range of values corresponding to each bucket; and
comparing the scaled intermediate result for each bucket to the second comprehensive result; and
responsive to determining that a second bucket of the plurality of buckets has a corresponding sampling error below a threshold, selecting a second sampling rate for a third data processing job corresponding to a third data by selecting the trial sampling rate corresponding to second bucket.

6. The method of claim 1, wherein:
at least two buckets are assigned a same corresponding fraction; and
wherein adaptively selecting the first sampling rate further comprises, further comprises:
responsive to determining that the difference between the determined sampling errors corresponding to the at least two buckets assigned the same corresponding fraction is less than a variance threshold, selecting the sampling rate for the second data processing job corresponding to the second data by selecting the trial sampling rate corresponding to the at least two buckets.

7. The method of claim 1, wherein adaptively selecting the sampling rate is responsive to processing a threshold volume of data.

8. The method of claim 1, wherein the first server and the second server are the same server.

9. A non-transitory computer-readable storage medium storing processor-executable computer program instructions that, when executed, cause a computer processor to perform a method, the method comprising:
adaptively selecting a first sampling rate, comprising:
determining a first plurality of trial sampling rates corresponding to a first data processing job, comprising:
assigning a first data, having a first range of values, to a first plurality of buckets by assigning data corresponding to a respective fraction of the first range of values to each bucket, wherein at least two buckets are assigned different fractions, and wherein each fraction represents a corresponding trial sampling rate;
determining a plurality of sampling errors, each sampling error corresponding to a respective one of the plurality of buckets, comprising:
assigning each of the plurality of buckets to a respective processing unit;
receiving, for each bucket, an intermediate result of processing the corresponding data by the assigned processing unit;
combining the intermediate results to generate a first comprehensive result corresponding to the first data;
scaling the intermediate result for each bucket according to the respective fraction of the first range of values corresponding to each bucket; and
comparing the scaled intermediate result for each bucket to the first comprehensive result; and
responsive to determining that a first bucket of the first plurality of buckets has a corresponding sampling error below a threshold, selecting a first sampling rate for a second data processing job corresponding to a second data by selecting the trial sampling rate corresponding to the first bucket.

10. The medium of claim 9, wherein the first data comprises a plurality of pairings comprising a data value and a list of data keys, and wherein the range of values corresponds to the range of values of the data keys.

11. The medium of claim 9, wherein selecting the first sampling rate for the second data processing job further comprises sampling the second data according to the selected first sampling rate for the second data processing job.

12. The medium of claim 9, wherein adaptively selecting the first sampling rate further comprises:
determining a second plurality of trial sampling rates corresponding to a second data processing job, comprising:
assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
determining a second plurality of sampling errors, each sampling error corresponding to one of the second plurality of buckets, comprising:
assigning each of the plurality of buckets to a respective processing unit;
receiving, for each bucket, an intermediate result of processing the corresponding data by the assigned processing unit;
combining the intermediate results to generate a second comprehensive result corresponding to the second data;
scaling the intermediate result for each bucket according to the respective fraction of the second range of values corresponding to each bucket; and
comparing the scaled intermediate result for each bucket to the second comprehensive result; and
responsive to determining that a second bucket of the plurality of buckets has a corresponding sampling error below a threshold, determining a second sampling rate for a third data processing job corresponding to a third data by selecting the trial sampling rate corresponding to second bucket and multiplying the selected trial sampling rate with the sampling rate for the second data processing job.

13. The medium of claim 9, wherein adaptively selecting the first sampling rate further comprises, further comprises:
responsive to determining that no bucket of the first plurality of buckets has a corresponding sampling error below a threshold:
determining a second plurality of trial sampling rates corresponding to a second data processing job, comprising:
assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
determining a second plurality of sampling errors, each sampling error corresponding to one of the second plurality of buckets, comprising:
assigning each of the plurality of buckets to a respective processing unit;
receiving, for each bucket, an intermediate result of processing the corresponding data by the assigned processing unit;
combining the intermediate results to generate a second comprehensive result corresponding to the second data;
scaling the intermediate result for each bucket according to the respective fraction of the second range of values corresponding to each bucket; and
comparing the scaled intermediate result for each bucket to the second comprehensive result; and
responsive to determining that a second bucket of the plurality of buckets has a corresponding sampling error below a threshold, selecting a second sampling rate for a third data processing job corresponding to a third data by selecting the trial sampling rate corresponding to second bucket.

14. The medium of claim 9, wherein:
at least two buckets are assigned a same corresponding fraction; and
wherein adaptively selecting the first sampling rate further comprises, further comprises:
responsive to determining that the difference between the determined sampling errors corresponding to the at least two buckets assigned the same corresponding fraction is less than a variance threshold, selecting the sampling rate for the second data processing job corresponding to the second data by selecting the trial sampling rate corresponding to the at least two buckets.

15. The medium of claim 9, wherein adaptively selecting the sampling rate is responsive to processing a threshold volume of data.

16. The medium of claim 9, wherein the first server and the second server are the same server.

17. A system comprising:
a processor; and
a non-transitory computer-readable storage medium storing processor-executable computer program instructions that, when executed, cause a computer processor to perform a method, the method comprising:
adaptively selecting a first sampling rate, comprising:

determining a first plurality of trial sampling rates corresponding to a first data processing job, comprising:
  assigning a first data, having a first range of values, to a first plurality of buckets by assigning data corresponding to a respective fraction of the first range of values to each bucket, wherein at least two buckets are assigned different fractions, and wherein each fraction represents a corresponding trial sampling rate;
determining a plurality of sampling errors, each sampling error corresponding to a respective one of the plurality of buckets, comprising:
  assigning each of the plurality of buckets to a respective processing unit;
  receiving, for each bucket, an intermediate result of processing the corresponding data by the assigned processing unit;
  combining the intermediate results to generate a first comprehensive result corresponding to the first data;
  scaling the intermediate result for each bucket according to the respective fraction of the first range of values corresponding to each bucket; and
  comparing the scaled intermediate result for each bucket to the first comprehensive result; and
responsive to determining that a first bucket of the first plurality of buckets has a corresponding sampling error below a threshold, selecting a first sampling rate for a second data processing job corresponding to a second data by selecting the trial sampling rate corresponding to the first bucket.

18. The system of claim 17, wherein the first data comprises a plurality of pairings comprising a data value and a list of data keys, and wherein the range of values corresponds to the range of values of the data keys.

19. The system of claim 17, wherein selecting the first sampling rate for the second data processing job further comprises sampling the second data according to the selected first sampling rate for the second data processing job.

20. The system of claim 17, wherein adaptively selecting the first sampling rate further comprises:
  determining a second plurality of trial sampling rates corresponding to a second data processing job, comprising:
    assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
  determining a second plurality of sampling errors, each sampling error corresponding to one of the second plurality of buckets, comprising:
    assigning each of the plurality of buckets to a respective processing unit;
    receiving, for each bucket, an intermediate result of processing the corresponding data by the assigned processing unit;
    combining the intermediate results to generate a second comprehensive result corresponding to the second data;
    scaling the intermediate result for each bucket according to the respective fraction of the second range of values corresponding to each bucket; and
    comparing the scaled intermediate result for each bucket to the second comprehensive result; and
  responsive to determining that a second bucket of the plurality of buckets has a corresponding sampling error below a threshold, determining a second sampling rate for a third data processing job corresponding to a third data by selecting the trial sampling rate corresponding to second bucket and multiplying the selected trial sampling rate with the sampling rate for the second data processing job.

21. The system of claim 17, wherein adaptively selecting the first sampling rate further comprises, further comprises:
  responsive to determining that no bucket of the first plurality of buckets has a corresponding sampling error below a threshold:
    determining a second plurality of trial sampling rates corresponding to a second data processing job, comprising:
      assigning the second data, having a second range of values, to a second plurality of buckets by assigning data corresponding to a respective fraction of the second range of values to each bucket, wherein at least two buckets are assigned different fractions, and wherein each fraction represents a corresponding trial sampling rate;
    determining a second plurality of sampling errors, each sampling error corresponding to one of the second plurality of buckets, comprising:
      assigning each of the plurality of buckets to a respective processing unit;
      receiving, for each bucket, an intermediate result of processing the corresponding data by the assigned processing unit;
      combining the intermediate results to generate a second comprehensive result corresponding to the second data;
      scaling the intermediate result for each bucket according to the respective fraction of the second range of values corresponding to each bucket; and
      comparing the scaled intermediate result for each bucket to the second comprehensive result; and
    responsive to determining that a second bucket of the plurality of buckets has a corresponding sampling error below a threshold, selecting a second sampling rate for a third data processing job corresponding to a third data by selecting the trial sampling rate corresponding to second bucket.

22. The system of claim 17, wherein:
at least two buckets are assigned a same corresponding fraction; and
wherein adaptively selecting the first sampling rate further comprises, further comprises:
  responsive to determining that the difference between the determined sampling errors corresponding to the at least two buckets assigned the same corresponding fraction is less than a variance threshold, selecting the sampling rate for the second data processing job corresponding to the second data by selecting the trial sampling rate corresponding to the at least two buckets.

23. The system of claim 17, wherein adaptively selecting the sampling rate is responsive to processing a threshold volume of data.

24. The system of claim 17, wherein the first server and the second server are the same server.

\* \* \* \* \*